United States Patent
Isella et al.

[11] Patent Number: 5,937,781
[45] Date of Patent: Aug. 17, 1999

[54] FLOATING PILING ATTACHMENT DEVICE WITH SHOCK ABSORBING CAPABILITY

[76] Inventors: John J. Isella, 202 Shore Dr., Branford, Conn. 06405; Lawrence J. Mercugliano, Jr., 198 Haverford St., Hamden, Conn. 06517

[21] Appl. No.: 08/888,351

[22] Filed: Jul. 3, 1997

[51] Int. Cl.⁶ .................................................. B63B 21/00
[52] U.S. Cl. ................................. 114/230.26; 114/230.27
[58] Field of Search ................................... 114/219, 230, 114/230.1, 230.25, 230.26, 230.27, 230.2

[56] References Cited

U.S. PATENT DOCUMENTS

| | | | |
|---|---|---|---|
| 3,695,209 | 10/1972 | Glese | 114/230 |
| 3,997,150 | 12/1976 | Hanson et al. | 114/219 |
| 4,110,989 | 9/1978 | Selkirk | 405/248 |
| 4,357,891 | 11/1982 | Sluys | 114/230 |
| 4,458,620 | 7/1984 | Bingham | 114/230 |
| 4,480,576 | 11/1984 | Mills | 114/230 |
| 4,488,502 | 12/1984 | Girard | 114/230 |
| 4,726,313 | 2/1988 | Neal | 114/230 |
| 4,735,164 | 4/1988 | Burg | 114/67 A |
| 4,887,654 | 12/1989 | Rytand | 114/267 |
| 4,899,680 | 2/1990 | Russell, Jr. | 114/230 |
| 4,940,021 | 7/1990 | Rytand | 114/267 |
| 4,979,453 | 12/1990 | Sloan et al. | 114/263 |
| 4,990,029 | 2/1991 | Hemminger | 405/203 |
| 5,014,638 | 5/1991 | Ilves et al. | 114/230 |
| 5,044,829 | 9/1991 | Hemminger | 405/203 |
| 5,107,785 | 4/1992 | Baxter | 114/266 |
| 5,174,234 | 12/1992 | Ryan | 114/230 |
| 5,184,562 | 2/1993 | Hallin | 114/219 |
| 5,265,553 | 11/1993 | Brydges | 114/230 |
| 5,307,753 | 5/1994 | Besonen, Sr. et al. | 114/230 |
| 5,341,757 | 8/1994 | Digiacomo | 114/230 |
| 5,361,716 | 11/1994 | Cotton | 114/230 |
| 5,425,324 | 6/1995 | Cotton | 114/230 |
| 5,467,727 | 11/1995 | Godvin et al. | 114/230 |
| 5,493,991 | 2/1996 | Wright et al. | 114/230 |
| 5,513,592 | 5/1996 | Cotton | 114/219 |
| 5,575,234 | 11/1996 | Dysarz | 114/230 |
| 5,588,387 | 12/1996 | Tellington | 114/261 |
| 5,588,782 | 12/1996 | Haring | 405/218 |

*Primary Examiner*—Sherman Basinger
*Attorney, Agent, or Firm*—Lloyd W. Sadler

[57] ABSTRACT

A watercraft mooring device is described which permits the watercraft to rise and drop vertically with the water level and which provides both direct shock absorption between the watercraft and the fixed mooring point, such as the pier or piling, and protection against scraping between the watercraft and the fixed mooring point. A floating tube is provided, which is designed to loosely fit over and around the fixed mooring point and which provides one or more attachment grooves for holding an attachment rope, cord or cable in place. The provided floating tube includes one or more securing hooks for securing the attachment rope, cord or cable when it is not needed to moor the watercraft. This invention solves the significant problem of damage to boats and other watercraft caused by impact and scraping against the pier and piling. Moreover, by providing a floating mooring device, the watercraft is permitted to maintain the same relative distance between the watercraft and the fixed mooring point, and therefore providing a device for protecting a watercraft from undesirable contact with other mooring structures.

5 Claims, 2 Drawing Sheets

FLOATING PILING ATTACHMENT DEVICE WITH SHOCK ABSORBING CAPABILITY

BACKGROUND OF THE INVENTION

1. Field of the Invention

This invention relates to an apparatus for attaching a watercraft to a piling, which attachment permits vertical movement of the moored watercraft due to changes in water level with respect to the piling. More specifically, this invention relates to a watercraft attachment which floats with the water level, rolls relatively freely around the piling and provides a bumper, or shock absorber, for the watercraft to piling interface. This invention is designed to function with very high reliability, that is without any mechanical parts that can be subject to the corrosive influence of ocean, lake or river water and to protect the watercraft from direct damaging impact with the piling.

2. Description of Related Art

Since man first built crafts to travel on the surface of the water, the problem of fixing the watercraft to a particular point has been addressed. In prehistory times, and to this day with small crafts, simply pulling the boat onto the land was the solution. However, with larger watercraft more elaborate solutions were and are needed. Where possible docks, piers and pilings are installed where the boats are to be moored. Such devices for fixing the boats are necessary for providing a means for embarking or disembarking. Fixed structures, such as docks, piers, or pilings, however, have certain limitations with respect to watercraft. Not the least of these limitations include the problem caused by the rising and falling of the water level and the damage that can be done to the watercraft by rubbing or impacting the dock, pier or piling. When the water level changes the relative location of the boat to the dock, pier or piling can change, permitting the boat to drift farther away or to be drawn in to the fixed structure. When a boat is drawn into a fixed structure, either by the change in water level, waves or even an impact from another watercraft, the impact and/or frictional rubbing can cause serious and significant damage to the boat. Many modern watercraft are made out of light weight materials, such as plastic, composites, and fiberglass. These, as well as boats with wood or metal hulls, are susceptible to damage from the impact with fixed mooring structures. This invention addresses this problem through the use of a floating tube, composed of a relatively flexible corrosion resistant material, which fits over and around a piling and to which a watercraft may be affixed. As the water level rises or falls the tube rises or falls, thereby maintaining the distance between the watercraft and the piling. When the watercraft is forced into the piling the shock absorbing characteristics of the tube protects the watercraft from damage. Moreover, when the watercraft is forced to rub back and forth against the piling, the tube acts as a frictional insulator by rotating around the piling with the watercraft, thereby protecting the watercraft from the frictional scraping with the fixed piling.

While this invention is novel in its simplicity and efficiency, it is by no means the only approach to the solution of this problem. Various other mechanical or structural approaches have been proposed.

One approach secures the watercraft through the use of beams with slidably attached arms which are clamped to the watercraft. The boat with rise and fall with the water level so long as the slidable attachment remains relatively friction free. No shock absorbing capability is provided because the boat is fixed horizontally in place by the attached arms. Energy imparted to the boat is absorbed either by the boat itself, the attachment point or the fixed arms.

Another approach involves the use of an elongate resiliently yielding member which is attached at one end to the floating object and at the other end at fixed mooring structure. The flexibility of the yielding member provides some capability to float with the water level and a fender can be attached to serve as a sort of protector to the floating object.

Another approach employs a spring attached at one end to the pier and at the other end to an arm having an attachment point for connecting on a boat to limit its movement relative to the pier or float. While this approach addresses some the problems associated with movement from waves or wind is does not appear to adequately address the rising and falling of the water level.

A further approach accomplishes vertical adjustment of the mooring via a pair of cables connected vertically between four dock posts and having a pulley to adjust the vertical level of the boat.

A device for water motion cushioning has been proposed that uses an extendible tension spring to anchor boats and other objects in various desired positions where the desired effect is smooth ride upon the water surface.

Another approach is provided which uses a plurality of nylon lines, a snaphook for connecting each line to the boat, a counterweight connected to the other end of each line, and hardware for mounting on a plurality of pilings. This approach addresses the vertical motion problem without addressing the impact problem.

Boat docking systems are proposed which provide bumper or shock absorbing capabilities, and which require the a number of poles or flexible rods and which require that the boat fit or be positioned between the poles or rods. Floating dock systems are also used and well known.

Another mooring system includes a multiple degree of freedom coupler interconnecting a floatation section and anchoring section of a dock system. This system also includes a drawbridge, gangway and shoreline mooring section.

Another mooring system uses a cylinder and piston providing for adjustability for the length of the connecting unit and the connecting unit is connected to the mooring structure in a manner that slidably provides for movement with the tide.

Another mooring device uses two shank members, axial protuberances and three integrally connected cross arm members, and a pair of spaced apart cross arms to connect between the boat and a mooring point.

Other approaches for securing a boat or other floating objects, that allow vertical movement of the boat, or floating objects, in response to change in the water level where the boat is connected to at least one vertically extending shaft which extends upwardly above the surface of the water by ring-like floats having split sections so the boat can be connected to the rings and the shaft can be received through the split sections of the rings.

Another mooring device uses a circular plate, a tubular shaft passing through and fixed to the circular plate, with guide rods serving to guide the mooring ring over and past the circular plate for mooring a watercraft to a dock or a floating buoy.

Another mooring apparatus arrangement permits the boat to rise and drop vertically with the tides or wave action but which constrains the boat from lateral movement relative to a fixed dock or pier using a pair cylindrical posts, affixed to the dock or pier, each of which has a carriage assembly comprising a U-shaped collar having rollers to cooperate with the exterior surface of the posts and ride up and down to accommodate the changes in water level. Such a device does not appear to address the problem of impacts with either the pier or the posts of the apparatus.

Another boat mooring apparatus uses a pair of spring wires extending from the dock and over the water to brackets supporting a horizontal roller to be engaged by a boat-mounted latch.

Another vessel mooring device permits vertical movement of boats by a mooring member looped around a support arm.

For general background material, the reader is directed to U.S. Pat. Nos. 3,695,209, 4,110,989, 4,458,620, 4,480,576, 4,488,502, 4,726,313, 4,735,164, 4,887,654, 4,899,680, 4,940,021, 4,979,453, 4,990,029, 5,014,638, 5,044,829, 5,107,785, 5,174,234, 5,184,562, 5,265,553, 5,307,753, 5,341,757, 5,361,716, 5,425,324, 5,493,991, 5,513,592, 5,575,234, 5,588,387, and 5,588,782 each of which is hereby incorporated by reference in its entirety for the material disclosed therein.

SUMMARY OF THE INVENTION

It is desirable to provide an attachment device for the mooring of watercraft to pilings that (1) permits the watercraft to rise and fall with the water level without being permitted to draw closer or float farther away from the piling; (2) provides shock absorbing and scraping protection to the watercraft; (3) that is resistant to corrosion; (4) has no mechanical parts to stick, wear or corrode; and (5) incorporates a pair of securing hooks for securing the attachment cable, rope or cord while the watercraft is not moored to the attachment device.

Accordingly, it is a general objective of this invention to provide an attachment device for watercraft to pilings that permits the watercraft to rise and fall with the water level without the distance to the piling changing.

Another objective of this invention is to provide an attachment device for watercraft to pilings that provides shock absorbing between the watercraft and the piling.

A further objective of this invention is to provide an attachment device for watercraft to pilings that rolls on the piling avoiding the watercraft from back and forth scraping with the piling.

A still further objective of this invention is to provide an attachment device for watercraft to pilings that is resistant to corrosion or mechanical failure.

A further objective of this invention is to provide an attachment device for watercraft to pilings that incorporates securing hooks for securing the attachment cable to the attachment device when not in use, that is when the watercraft is not moored to the attachment device.

Additional objects, advantages and novel features of the invention will be set forth in part in the description which follows, and in part will become apparent to those skilled in the art upon examination of the following or may be learned by the practice of the invention. The objects and advantages of this invention may be realized and attained by means of the instruments and combinations particularly pointed out in the appended claims.

These and other objectives of this invention are achieved by a tube device, composed of a flexible, floatable material, which is installed over a piling and which has one or more ridges to provide attachment points for cords from the watercraft.

DETAILED DESCRIPTION OF THE INVENTION

Note that for the purpose of this patent disclosure watercraft is defined to mean boat, ship, raft, water recreational devices and the like; fixed mooring point is defined to mean pier, piling, post, dock and the like; and cable is defined to mean rope, cord, cable, chain, wrap and the like.

Figure 1:
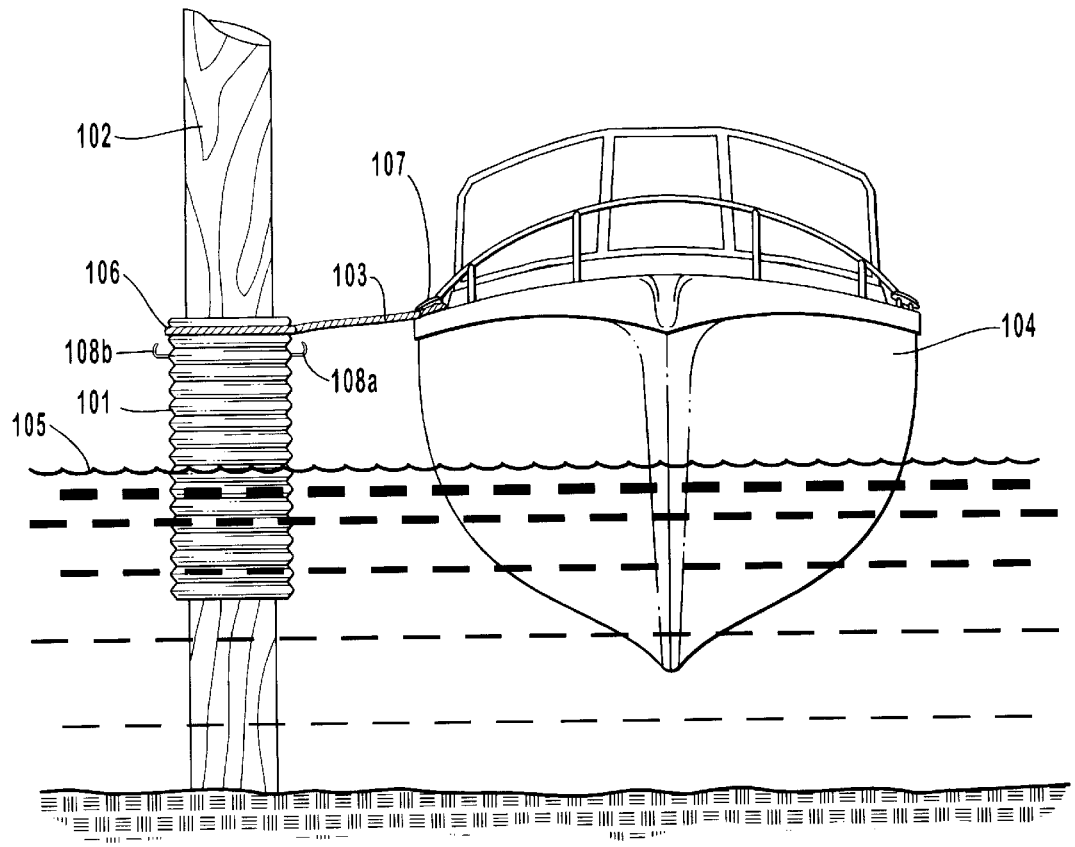
FIG. 1 is an elevational view showing the floating tube invention being used with a boat in its preferred embodiment.

FIG. 1 depicts the preferred embodiment of the invention in use. The floating piling attachment invention 101 is shown partially submerged under the water level 105. In its preferred use it is positioned on and around a piling 102. A watercraft 104 is moored to the piling 102 via a cable 103 which is affixed to the watercraft 104 attachment point 107 and to the floating piling attachment invention 101.

It can be seen from FIG. 1 that the invention 101 is somewhat larger than the piling 102. This is to (1) accommodate the installation of the invention 101 over the piling 102; and (2) to permit nearly free rotational movement of the invention 101 around the piling 102. Such rotational movement is advantageous because is permits the forward and backward motion of the watercraft, typically caused by waves, between the watercraft 104 and the pier 102 while insulating the watercraft 104 from scraping with the fixed pier 102. It can also be seen from FIG. 1 that the invention 101 is only partially submerged, that is, the invention 101 floats on the water and that the attachment cable 103 is attached to the invention 101 rather than to the pier 102 or any other fixed object. Since the invention 101 floats with the water level 105 simultaneous with the watercraft 104 the attachment cable 103 maintains a generally consistent distance between the pier 102 and the watercraft 104 without regard to the water level 105. Securing hooks 108a,b are shown in the top portion of the invention 101 to provide a means of securing the attachment cable 103 to the invention 101 when the cable is not in use. In the preferred embodiment of the invention, a pair of securing hooks 108a,b are incorporated at opposite sides of the invention 101. Alternative embodiments of the invention may incorporate any number of securing hooks or the equivalent for the purpose of securing the attachment cable to the invention 101 when the watercraft is not moored.

Figure 2:
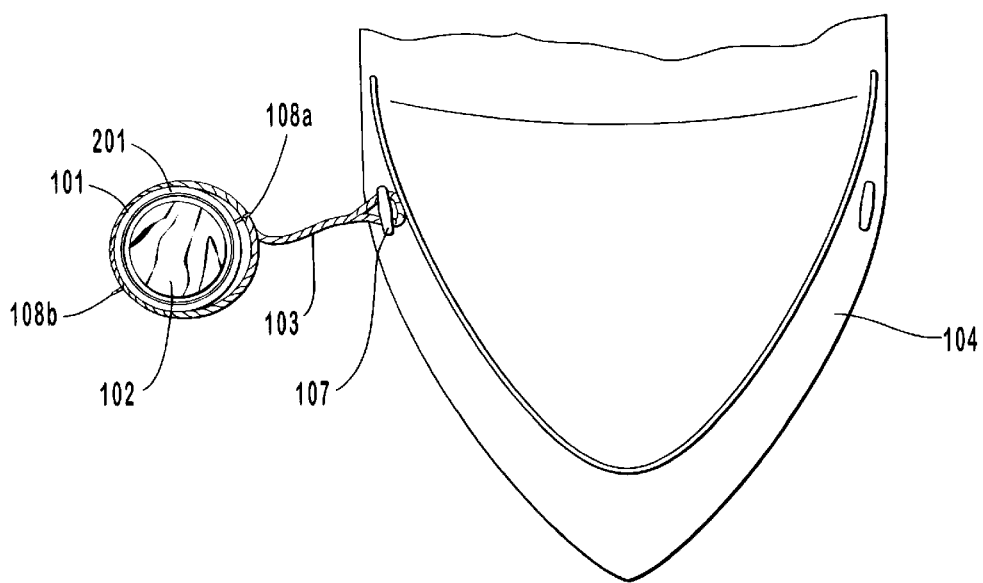
FIG. 2 is a top view of the floating tube invention as it is used in its preferred embodiment.

FIG. 2 provides a top—down view of the watercraft 104 moored to the pier 102 via the attachment cable 103, which is attached at one end to the watercraft 104 attachment point 107 and to the invention 101. This view provides another perspective on the spacing 201 between the invention 101 and the pier 102. The purposes and advantages provided by the invention 101 because of the spacing between the invention 101 and the pier 102 are described above.

Figure 3:
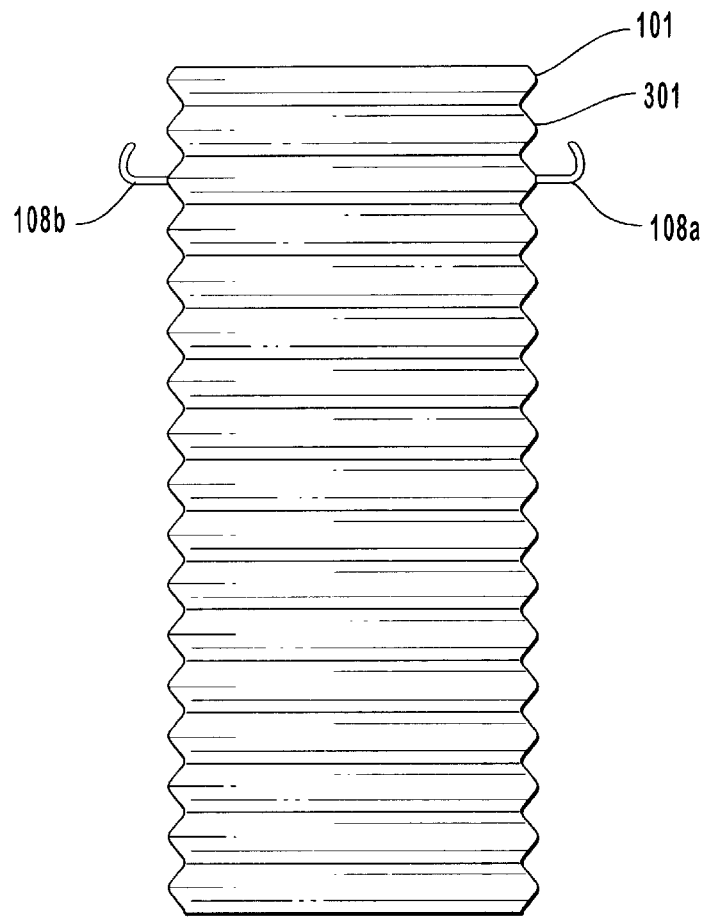
FIG. 3 is a detail side view of the floating tube invention.

FIG. 3 depicts a side view of the invention 101. A number of grooves 301 are formed in the exterior of the invention 101. These grooves 301 provide attachment points for one or more attachment cables 103. In its preferred embodiment the invention 101 is composed of high density polyethylene (common plastic). Alternatively, the invention 101 could also be made of rubber, wood, metal canisters, inflatable balloons and the equivalent. Also, in its preferred embodiment, the invention is from 4 feet to 15 feet tall, 12 to 48 inches in diameter, and 2 to 6 inches in thickness.

Figure 4:
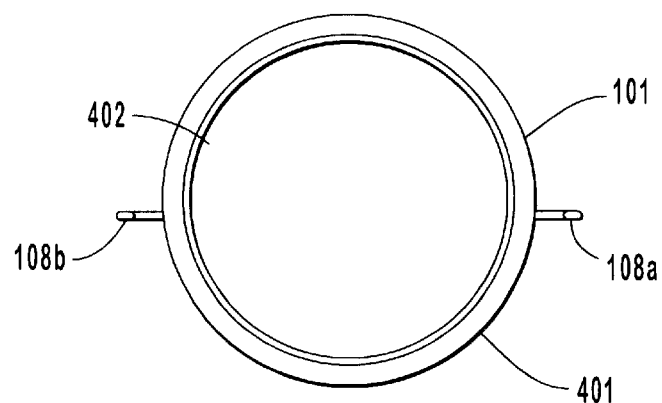
FIG. 4 is a top view of the floating tube invention.

FIG. 4 depicts a top view of the invention 101 showing the interior 402 and the exterior 401 of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled, including the range of equivalents to the appended claims.

We claim:

1. An apparatus for providing mooring capability between a watercraft and a fixed mooring point using an attachment cable comprising:

(A) an interior surface, which is positioned around the fixed mooring point;

(B) an exterior surface, having a generally circular perimeter with a top end, a bottom end and a number of grooves formed thereon for attaching the attachment cable to the apparatus;

(C) a buoyant structure, within said interior surface and said exterior surface, for providing the means of floating the invention with the watercraft, and wherein said buoyant structure is a single piece of buoyant material; and (D) at least a pair of hooks each affixed to an opposite side of said generally circular perimeter of said exterior surface between said top end and said bottom end, for securing the attachment cable to said exterior surface when the attachment cable is not in use between the watercraft and fixed mooring point.

2. An apparatus for providing mooring capability between a watercraft and a fixed mooring point using an attachment cable, as recited in claim 1, wherein said interior surface is greater in diameter than the diameter of the fixed mooring point.

3. An apparatus for providing mooring capability between a watercraft and a fixed mooring point using an attachment cable, as recited in claim 1, wherein said buoyant structure is capable of floating with the water level.

4. An apparatus for providing mooring capability between a watercraft and a fixed mooring point using an attachment cable, as recited in claim 1, wherein said buoyant structure is capable of rotating around the fixed mooring point.

5. An apparatus for providing mooring capability between a watercraft and a fixed mooring point using an attachment cable, as recited in claim 1, wherein said buoyant structure is composed of plastic material.

* * * * *